United States Patent Office 2,948,637
Patented Aug. 9, 1960

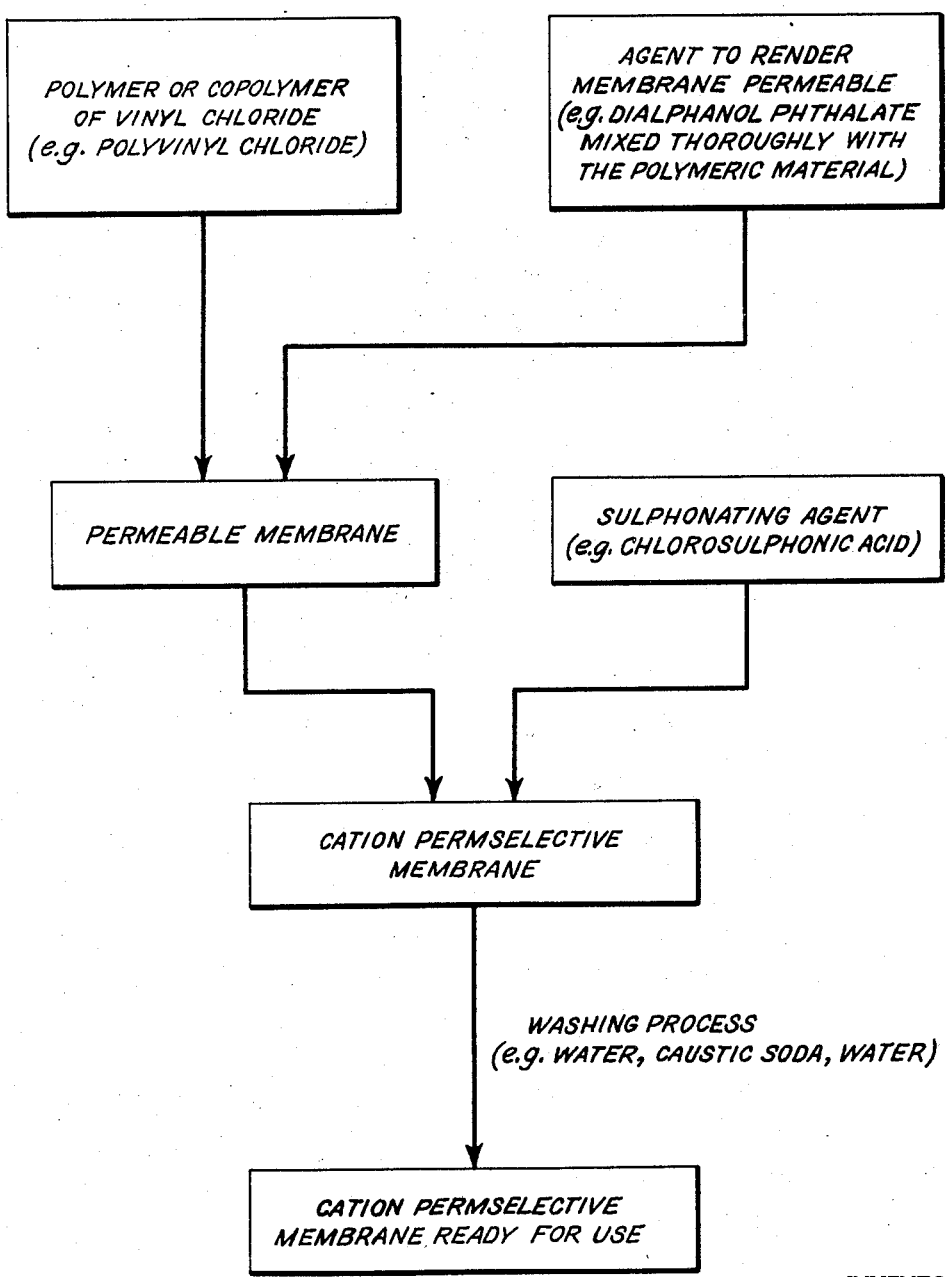

2,948,637

PROCESS OF SULFONATING A PLASTICIZED POLYVINYL CHLORIDE FILM TO FORM A CATION PERMSELECTIVE MEMBRANE

Harry Thurston Hookway, Hampton Wick, Douglas Knight Hale, Hampton Hill, and Richard George Goldsmith, Kingston, England, assignors to National Research Development Corporation, London, England Filed Dec. 23, 1957, Ser. No. 704,305

Claims priority, application Great Britain Jan. 3, 1957

14 Claims. (Cl. 117—47)

This invention relates to the preparation of cation-permselective membranes which may be in the form of films or sheets or in the form of tubes or other structural shapes.

Cation-permselective membranes will allow the passage of cations either in the presence or absence of an electric field but are relatively impermeable to anions.

Cation-permselective membranes may be used in electrochemical and electrodialytic processes, for example in the preparation of sodium hydroxide by the electrolysis of sodium chloride solutions and in the electrodialytic desalting of sea water and other natural waters.

In these applications it is very advantageous if the electrical resistance and in particular the resistance of unit area of the membrane is low since unnecessary expenditure of electrical energy is then reduced. It is also an advantage if the membranes show highly permselective behaviour, particularly in concentrated solutions.

Cation permselective membranes prepared from materials with ion-exchange properties are described in British patent specification No. 720,002. The membranes are prepared either from the ion-exchange material itself with, if necessary, some reinforcing material, or from an ion-exchange resin in particulate form and in inert binder such as polyethylene or polyvinyl chloride.

Other methods for the preparation of cation-permselective membranes include the treatment of foils or films of a suitable material in such a way that they acquire cation-exchange properties. Membranes with cation-permselective properties may for example be obtained by treating collodion membranes with a solution of polystyrene sulphonic acid, or, as described in British patent specification No. 747,948, by treating a thin sheet of a pure polymer of an aliphatic vinyl hydrocarbon, for example polyethylene, or polyvinyl chloride, with a sulphonating agent such as chlorosulphonic acid.

The present invention provides a process which enables the preparation of cation-permselective membranes of particularly low electrical resistance, wherein a film or sheet of plasticised or swollen vinyl chloride polymer or co-polymer is treated with a sulphonating agent for example chlorosulphonic acid. Plasticised or swollen vinyl chloride polymers and copolymers contain anything from 10 to 60 parts by weight of plasticiser or swelling agent to each 100 parts by weight of polymer or copolymer and more usually from 30 to 50 parts by weight of the plasticiser or swelling agent.

The time and temperature employed in the treatment will depend upon the nature of the material and on the nature of the sulphonating agent. Treatment with a sulphonating agent is continued until the resistance of 1 sq. cm. of the membrane is less than 100 ohms. If treatment is unduly prolonged the physical properties of the membrane suffer.

The presence of the plasticiser or swelling agent not only fails to have a deleterious effect on the formation of the cation-permselective membrane but is actually of considerable advantage both in enabling the expeditious production of membranes of particularly low electrical resistance and in conferring upon the membranes so produced favourable mechanical properties which are permanent even atlhough the plasticiser or swelling agent used does not remain in the membrane which is produced. It thus appears that the mere presence of the swelling agent or plasticiser during sulphonation favours the desired sulphonation reaction and suppresses disadvantageous undesired side-reactions which have an adverse effect on the mechanical properties of the resultant membrane. Sulphonation should not however be unduly prolonged, as already stated above, since continued reaction after a membrane of the desired properties has been formed can only have a disadvantageous effect.

The treatment may be carried out at ordinary temperatures or at elevated temperatures. If elevated temperatures are used the preferred temperature range is 40° C. to 50° C.

Chlorosulphonic acid, a mixture of chlorosulphonic acid and sulphuric acid, chlorosulphonic acid and sulphur trioxide or chlorosulphonic acid and sulphuryl chloride are examples of sulphonating agents which may be used.

After treatment with the chlorosulphonic acid the residual acid may be allowed to hydrolyse or the membrane may be washed with sulphuric acid and then with water. If the latter method is employed, the concentration of the sulphuric acid may, with advantage, be decreased continuously.

If co-polymers are employed these may be co-polymers of vinyl chloride and vinylidene chloride.

Swelling may be effected with any suitable solvent, such as monochlorobenzene.

Examples of plasticisers which may be used are dioctyl phthalate, the polymeric plasticiser Reoflex 100, dialphanol phthalate (which is a diester of phthalic acid and a mixture of alcohols consisting mainly of normal nonyl alcohol), and dialphanol sebacate (which is a diester of sebacic acid and a mixture of alcohols consisting mainly of normal nonyl alcohol).

The drawing illustrates a flow sheet of the process.

The following examples illustrate the invention:

*Example 1.—Preparation of a cation-permselective membrane from polyvinyl chloride film*

A sheet of polyvinyl chloride, 0.005 in. in thickness and containing 100 parts of polyvinyl chloride and 50 parts of dialphanol phthalate as plasticiser was treated with chlorosulphonic acid at room temperature for 24 hours. The acid adhering to the sheet after its removal from the chlorosulphonic acid was allowed to hydrolyse in the air. The sheet was then washed successively with water, 2 N sodium hydroxide and water. The membrane obtained had good mechanical strength. The resistance of a 1 cm. square of the membrane was 50 ohms.

The electrochemical behaviour of the membrane was examined using an electrolytic cell constructed from the material known under the registered trademark "Perspex" and divided into two compartments by the membrane. The cell was fitted with platinum electrodes 2 in. in diameter and the effective membrane area was approximately 20 sq. cm. The two halves of the cell were each filled with 50 cc. of 1 N NaOH. An electric potential was then applied to the cell and a current of 0.5 ampere allowed to flow for 30 minutes, corresponding to the passage of $9.33 \times 10^{-3}$ faradays of electricity. After the experiment it was found that the amount of sodium hydroxide in the cathode compartment had increased by approximately $9.25 \times 10^{-3}$ gm. equivs. and the amount in the anode compartment had decreased by approximately the same amount.

*Example 2.—Preparation of a cation-permselective membrane from polyvinyl chloride film*

A disc of polyvinyl chloride film of the same composition and thickness as that employed in Example 1 was immersed in chlorosulphonic acid at room temperature and the temperature of the acid raised to 40° C. during a period of 10 minutes. The temperature of the acid was maintained at 40–45° C. for a further 50 minutes. The film was then removed from the chlorosulphonic acid, washed with concentrated sulphuric acid for 30 minutes and then allowed to stand in the air for a further 30 minutes. The film was next washed successively with water, 2 N sodium hydroxide and water. The membrane had good mechanical strength. The resistance of a 1 cm. square of the membrane was 35 ohms.

The electrochemical behaviour of the membrane was examined using the procedure described in Example 1. When a current of 0.5 ampere was passed for 30 minutes through the cell containing the membrane, the amount of sodium hydroxide in the cathode compartment increased by approximately $9.0 \times 10^{-3}$ gm. equiv. and the amount in the anode compartment decreased by approximately the same amount. To maintain a steady current of 0.5 ampere a potential of from 3 to 4 volts was required.

*Example 3.—Preparation of a cation-permselective membrane from a vinyl chloride-vinylidene chloride co-co-polymer*

A sheet of a vinyl chloride-vinylidene chloride co-polymer containing 4% of vinylidene chloride and 0.01 in. in thickness was allowed to swell in chlorobenzene for 30 minutes at room temperature, whereby the sheet takes up about 40 to 50% of the weight of the swelling agent. The sheet was then immersed in chlorosulphonic acid at room temperature and the temperature of the acid raised to 40° C. during a period of 10 minutes. The temperature was maintained at 40–50% C. for a further 30 minutes. The sheet was then removed from the chlorosulphonic acid, washed in concentrated sulphuric acid for 30 minutes and then allowed to stand in the air for a further 30 minutes. Finally the sheet was washed successively with water, 2 N sodium hydroxide solution and water. The membrane obtained had good mechanical strength. The resistance of a 1 cm. square of the membrane was 20 ohms.

The electrochemical behaviour of the membrane was examined using the procedure described in Example 1. When a current of 0.5 ampere was passed for 30 minutes through the cell containing the membrane, the amount of sodium hydroxide in the cathode compartment increased by approximately $8.7 \times 10^{-3}$ gm. equivs. and the amount in the anode compartment decreased by approximately the same amount. To maintain a steady current of 0.5 ampere a potential of about 4 volts was required.

*Example 4.—Preparation of a cation-permselective membrane from polyvinyl chloride film*

A sheet of polyvinyl chloride film containing 100 parts of polyvinyl chloride and 50 parts of dialphanol sebacate and 0.10 in. in thickness was immersed in chlorosulphonic acid for 40 minutes at room temperature (23° C.), washed in concentrated sulphuric acid for 30 minutes, allowed to stand in the air for a further 30 minutes, and washed successively with water, 2 N sodium hydroxide solution and water.

The electrochemical behaviour of the membrane was examined using the procedure described in Example 1. When a curent of 0.5 ampere was passed for 30 minutes through the cell containing the membrane the amount of NaOH in the cathode compartment increased by approximately $8.3 \times 10^{-3}$ gm. equivs. and the amount of NaOH in the anode compartment decreased by approximately the same amount. To maintain a steady current of 0.5 ampere a potential of about 4 volts was required. The electrical resistance of a 1 cm. square of the membrane was 16 ohms.

The following examples illustrate the use of the membranes of the present invention:

*Example 5—Preparation of sodium hydroxide from sodium chloride solution*

A membrane prepared by the procedure described in Example 2 was used to separate the two compartments of an electrolytic cell constructed from 1″ bore "Pyrex" glass pipe line and fitted with "Delanium" electrodes. The cathode compartment was filled with 50 cc. of 1.0 N sodium hydroxide solution and 10 cc. of water. The anode compartment was filled with 60 cc. of saturated sodium chloride solution. After passing a current of 1.0 ampere for 60 minutes, corresponding to the passage of $37.32 \times 10^{-3}$ faradays of electricity, the amount of sodium hydroxide in the cathode compartment had increased by $32.9 \times 10^{-3}$ gm. equivs., and only a slight trace of chloride ion could be detected in the sodium hydroxide solution.

*Example 6.—Electrolytic desalting of a sodium sulphate solution*

A cation-permselective membrane prepared by the method described in Example 1 and a sheet of Permaplex A–10, an anion-permselective membrane of the heterogeneous type containing a strongly basic anion-exchange resin, were used to separate the three compartments of an electrodialytic cell fitted with platinum electrodes 2 in. in diameter. The central compartment was 0.125 in. in thickness. The cathode and anode compartments were filled with 0.1 N sodium sulphate solution and 0.1 N sodium sulphate solution was passed through the central compartment at a flow rate of approximately 20 cc. per hour. A potential of 24 volts was applied to the cell and the current which was initially about 0.5 ampere decreased, over a period of about 15 minutes, to 0.1 ampere and then remained at this value during the course of the experiment. After the current had been passing for 1½ hours samples of the effluent were taken at intervals and the concentration of sulphate ion determined. Over a period of six hours the sulphate concentration in the effluent remained at a value of less than 1.6 mg. equivs. per litre compared with a concentration of 100 mg. equivs. per litre in the influent to the cell.

The following table shows the advantages of membranes according to the present invention:

| Material of film | Thickness of film in thousandths of an inch | Sulphonating Agent | Time of Sulphonation | Temperature at which sulphonation is carried out | Resistance in ohms of 1 cm. square of this film |
| --- | --- | --- | --- | --- | --- |
| Polyvinyl chloride | 8–10 | chlorosulphonic acid. | 24 hours. | Room___ | 3000–4000 |
| Polyvinyl chloride | 8–10 | ___do____ | 1 week__ | ___do____ | 1500–2000 |
| Polyvinyl chloride | 8–10 | ___do____ | 60 minutes. | 40–45° C. | 2000–3000 |
| 100 parts of polyvinyl chloride and 50 parts of diaphanol sebacate | 8–10 | ___do____ | 40 minutes. | Room___ | 16 |

What we claim is:
1. A process for the preparation of cation-permselective membranes which comprises treating with a sulphonating agent selected from the class consisting of chlorosulphonic acid and mixtures thereof with sulphuric acid, sulphur trioxide and sulphuryl chloride, a membrane of a material selected from the class consisting of vinyl chloride polymers and copolymers which have been treated with an agent that favors the desired sulphonation reaction, said last mentioned agent being present to the extent of from 10 to 60 parts per 100 parts by weight of said membrane material and consisting of a substance having at least one of the actions swelling and plasticizing upon said membrane material.

2. A process as defined in claim 1 in which the sulphonating step is carried out at a temperature of from 40° to 50° C.

3. A process as defined in claim 1 in which the sulphonating step is continued until the electrical resistance of the resulting membrane is less than 100 ohms per sq. cm.

4. A process as defined in claim 1 in which following the sulphonating step the membrane is washed with sulphuric acid and then with water.

5. A process as defined in claim 4 in which the sulphuric acid washing step is conducted with sulphuric acid of continuously decreasing concentration.

6. A process as defined in claim 1 in which the sulphonating step is carried out at normal temperature.

7. A process as defined in claim 1 in which following the step of sulphonating the membrane the residual sulphonating agent is allowed to hydrolyse.

8. A process as defined in claim 1 in which the treating agent is chlorobenzene.

9. A process as defined in claim 1 in which the treating agent is dialphanol phthalate.

10. A process as defined in claim 1 in which the treating agent is dialphanol sebacate.

11. A process as defined in claim 1 in which the membrane material is a vinyl chloride/vinylidene chloride copolymer.

12. A process for the preparation of cation-permselective membranes which comprises treating a sheet of plasticised polyvinyl chloride with chlorosulphonic acid at room temperature for a day, removing the sheet from the chlorosulphonic acid, allowing the chlorosulphonic acid adhering to the sheet to hydrolyse in air, and washing the sheet free from acids.

13. A process for the preparation of cation-permselective membranes which comprises treating a membrane of plasticised polyvinyl chloride with chlorosulphonic acid at from 40° C. to 45° C. for about an hour, washing the membrane with concentrated sulphuric acid, allowing the membrane to stand in air to hydrolyse residual chlorosulphonic acid, and thereafter washing the membrane free from acids.

14. A process for the preparation of cation-permselective membranes which comprises treating a membrane of a vinyl chloride, vinylidene chloride copolymer plasticised in chlorobenzene with chlorosulphonic acid at from 40° C. to 45° C. for about an hour, washing the membrane with concentrated sulphuric acid, allowing the membrane to stand in air to hydrolyse residual chlorosulphonic acid, and thereafter washing the membrane free from acids.

References Cited in the file of this patent

UNITED STATES PATENTS

| | | |
|---|---|---|
| 2,668,134 | Horton | Feb. 2, 1954 |
| 2,727,831 | Dixon | Dec. 20, 1955 |
| 2,820,756 | Wyllie | Jan. 21, 1958 |
| 2,832,698 | Walles | Apr. 29, 1958 |

FOREIGN PATENTS

| | | |
|---|---|---|
| 508,121 | Canada | Dec. 14, 1954 |